May 11, 1926.
H. M. PFLAGER
1,584,136
CAR TRUCK AND METHOD OF ASSEMBLING THE SAME
Filed June 4, 1925
2 Sheets-Sheet 1
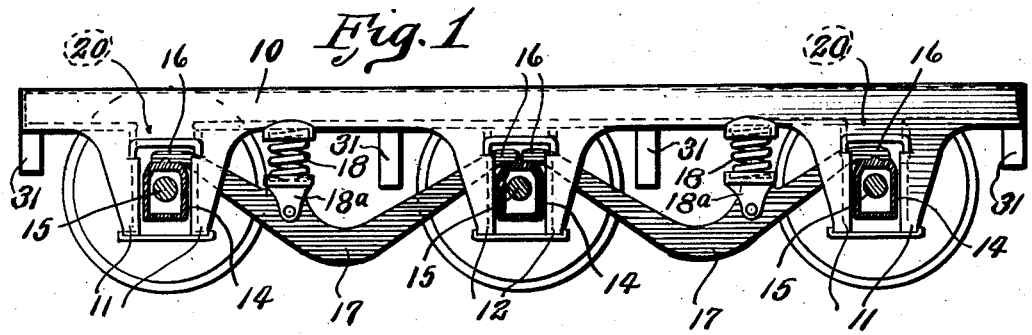
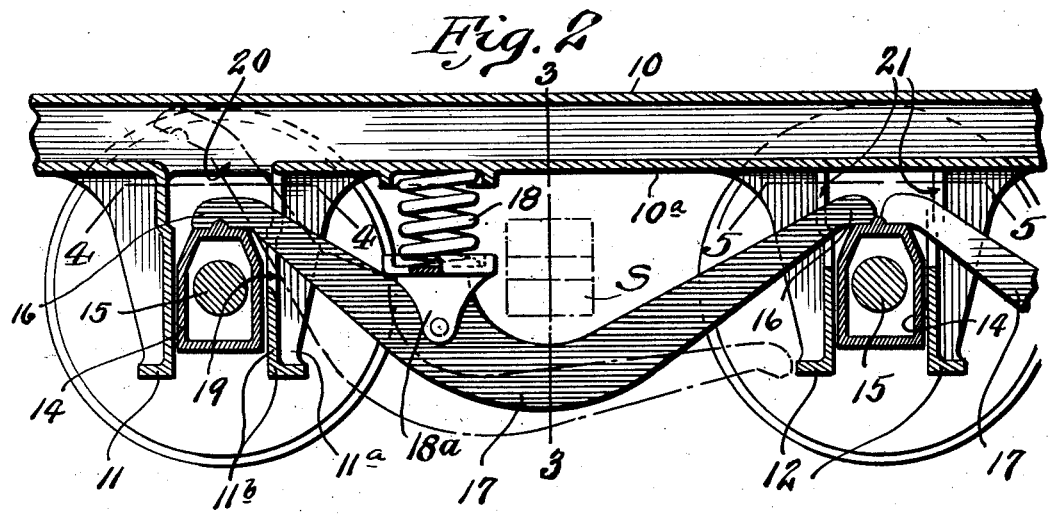
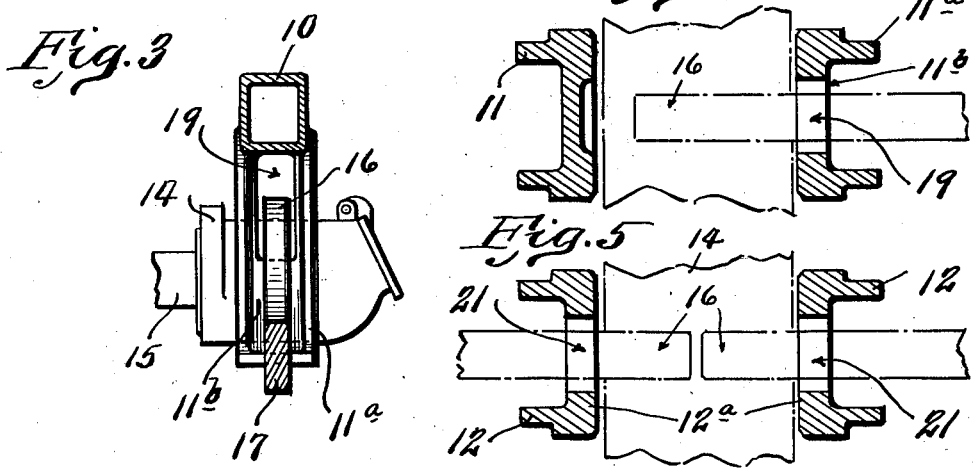
Inventor
Harry M. Pflager
By Cornwall, Birdell & James
Attys.

May 11, 1926. 1,584,136
H. M. PFLAGER
CAR TRUCK AND METHOD OF ASSEMBLING THE SAME
Filed June 4, 1925   2 Sheets-Sheet 2
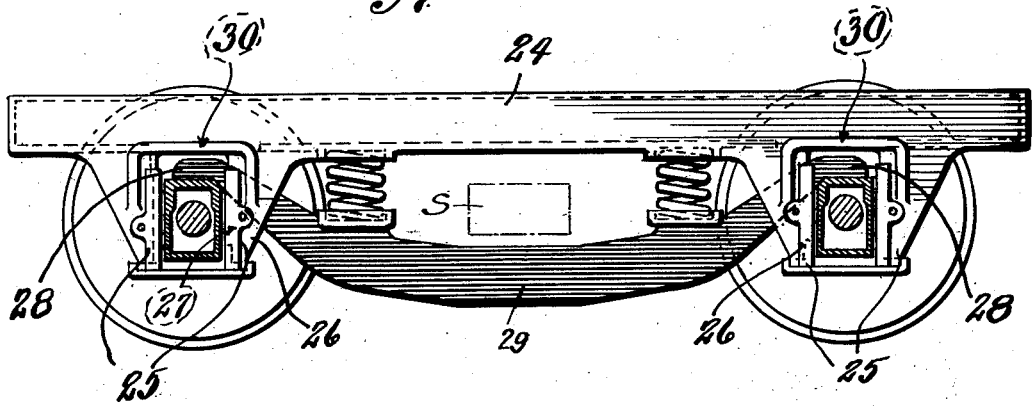
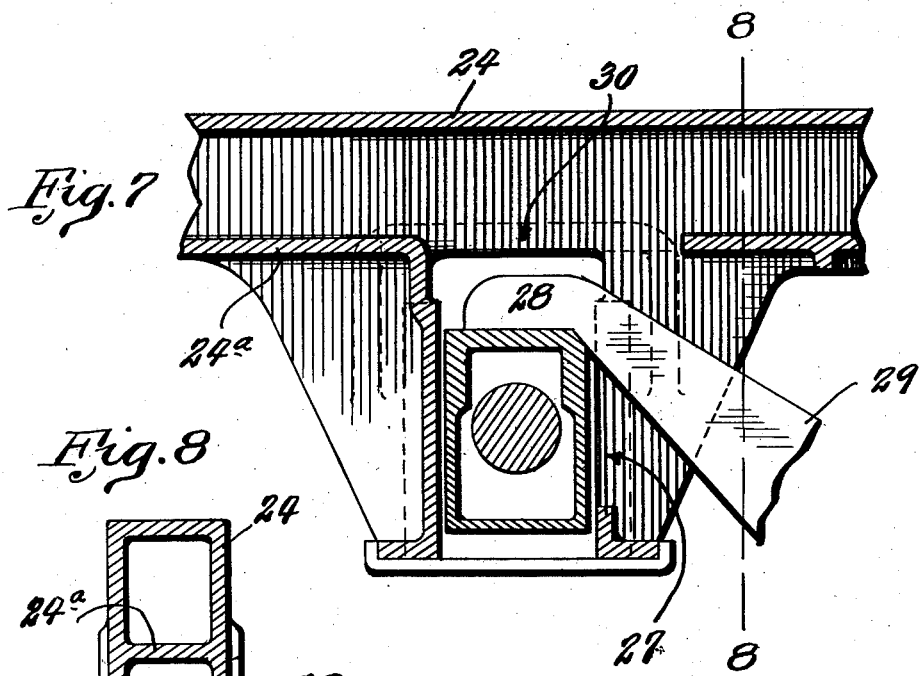
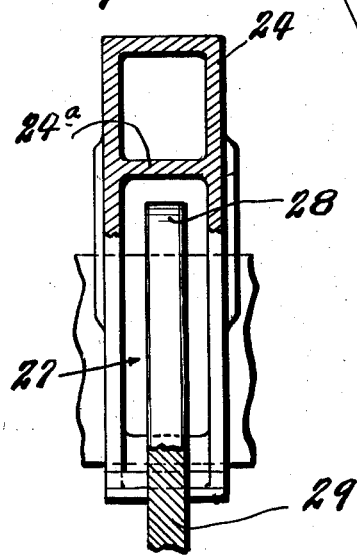
Inventor
Harry M. Pflager
By Cornwall, Birdell & Janus
Attys.

Patented May 11, 1926.

1,584,136

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK AND METHOD OF ASSEMBLING THE SAME.

Application filed June 4, 1925. Serial No. 34,984.

My invention relates to new and useful improvements in car truck construction and the main object of my invention is to provide a car truck having a wheel piece of the usual height, having pedestals either formed integrally with the wheel piece or permanently secured thereto, and having depressed equalizing bars adapted to be assembled with the pedestals by the insertion of one end of an equalizer bar in one pedestal leg and into the wheel piece, then moving the other end of the equalizing bar through an opening in the adjacent pedestal to an elevated position and then shifting the equalizing bar to its final position.

In copending applications filed by me June 7, 1924, Serial Numbers 718,516, 718,517 and 718,518, I disclose car truck construction for applying depressed equalizer bars to trucks having integral or permanently fixed pedestals, but in all of these constructions the application of the equalizer bar to the wheel piece calls for special construction of either the pedestals or the wheel pieces. In the first mentioned application, some of the pedestals are bifurcated through their lower ends and in the latter applications the wheel pieces are either formed with vertical openings or with recessed portions in the top walls thereof. In the present application a wheel piece having integral or permanently affixed pedestals is provided and the equalizer bar can be placed in position without necessitating unusual bifurcating of the pedestals or requiring unusual construction of the top wall of the wheel piece.

Due to the limitations on the height of the wheel piece and due to the occasional presence of car body elements immediately over the wheel piece and for other reasons, it is not always possible or desirable to provide the upward projections shown in my co-pending application 718,518 or to provide or use the wheel piece openings as described in my co-pending application 718,517, nor is it always desirable to construct the pedestals as described in my co-pending application No. 718,516. In my present invention I avoid the various features just mentioned chiefly by a novel equalizer bar structure.

In the constructions illustrated herein the equalizing bars depart from usual depressed equalizer shape in being inclined downwardly, at one or both of their ends, at smaller angles to the horizontal than is usual. This makes it possible to elevate or tilt one end of the equalizer and to move it towards the adjacent pedestal and away from the next pedestal to a greater extent than is possible with the ordinary equalizer bars such as are illustrated in my above mentioned copending applications. This is due to the fact that the bottom of the inclined portion of the ordinary equalizer when moved towards the pedestal leg would strike the edge of the opening in the leg before the opposite end of the equalizer could clear the leg of the corresponding pedestal.

I obtain the maximum movement of each equalizing bar from its pedestal by having the inclined portion of the bar extend at such small angle to the horizontal as will suffice to make the middle portion of the equalizer pass below the outwardy projecting bolster springs indicated at S (Figure 2). This makes the preferred construction of the equalizing bar substantially V-shaped, particularly in a six wheel truck in which the axles are closer together than in a 4 wheel truck.

With these and other objects in view, my invention consists in certain novel features of construction and arrangement of parts, hereinafter more fully described and claimed, and illustrated in the accompanying drawings, in which—

Figure 1 is a side elevational view of my improved six wheel car truck.

Figure 2 is a longitudinal cross section taken through a portion of the wheel piece and the pedestals thereof.

Figure 3 is a vertical cross section taken on line 3—3 of Figure 1.

Figure 4 is a horizontal cross section taken on line 4—4 of Figure 2.

Figure 5 is a horizontal cross section taken on line 5—5 of Figure 2.

Figure 6 is a side elevational view of a four wheel car truck.

Figure 7 is a longitudinal cross section through a portion of the wheel piece and the pedestal thereof.

Figure 8 is a vertical cross section taken approximately on line 8—8 of Figure 7.

Referring by numerals to the accompanying drawings, 10 indicates a wheel piece of a six wheel car truck frame, said wheel piece being preferably box-shaped in cross section and provided with integral end pedestals 11 and central pedestals 12. Operating between the jaws of the respective pedestals are journal boxes 14 in which are received the ends of wheeled axles 15. Resting on the journal boxes are the ends 16 of depressed equalizer bars 17, the body portions of which are disposed below and in vertical plane with the wheel piece 10.

Each equalizer bar 17 is provided with a spring seat 18ᵃ which receives the lower end of a coiled spring 18, the upper end of which is seated in a suitable spring seat formed on the underside of wheel piece 10. The inner jaw 11ᵃ of each pedestal 11 is provided in its web portion 11ᵇ with an opening 19 which extends downwardly from the bottom wall 10ᵃ of wheel piece 10 a sufficient distance to allow insertion of one end 16 of equalizer bar 17 therethrough and also to provide proper clearance for the play of said bar.

The wheel piece 10, which is box-shape in cross section, has a portion of its bottom wall 10ᵃ removed at points above the journal box openings formed by pedestals 11 as indicated at 20, thereby providing an opening through which one end of the equalizer bar 17 can enter the interior of the wheel piece to permit displacement of said bar during the application thereof in position, as shown by dotted lines in Figure 2.

The web portions 12ᵃ of the central pedestal jaws 12 are provided with openings 21 in order to receive and accommodate the inner ends of the equalizer bars 17 and these openings are of sufficient dimensions to provide for undisturbed operating movements of said bars under normal operating conditions.

To place the equalizer bar in position, said bar is tilted or displaced, as indicated in dotted lines in Figure 2, whereby one end thereof can enter, through the openings 19 and 20, the interior of the wheel piece a sufficient distance to bring the opposite end of said bar clear of the central pedestal 12, whereby said end can then be brought upwardly opposite to the respective opening 21. The equalizer bar can now be moved longitudinally so as to position both ends 16 on the respective journal boxes 14.

In the four wheel truck illustrated in Figures 6 to 8, a wheel piece 24 has formed integral therewith pedestals 25, the inner jaws or legs 26 of which are provided with openings 27 for receiving the ends 28 of a depressed equalizer bar 29. The bottom wall 24ᵃ of wheel piece 24, which latter is preferably box-shape in cross section, is cut away at a point above the journal box opening, thereby forming an opening 30 through which one end of the equalizer bar can be inserted into the wheel piece in applying said bar in position. The web portion of the outer jaw of each pedestal 25 is formed imperforate and merges with the bottom wall 24ᵃ of wheel piece 24.

The pedestals being formed integral with the wheel piece eliminates machining and assembly operations and provides a strong and durable construction. By forming openings in the web portions of certain of the pedestal jaws and in the appropriate points in the bottom wall of the wheel piece, sufficient clearance is provided to permit the application of the equalizer bar in operative position and it is not necessary to perforate or distort the top wall of the wheel piece or to bifurcate any one of the pedestal jaws, thereby preserving the rigidity and strength of the structure.

In both of the structures shown in the drawings, the pedestal jaws are indicated as being formed integrally with the wheel piece although these jaws may be formed separately and bolted or riveted to the wheel piece without affecting the essential features of my invention. I also indicate as part of my preferred structure the integral formation of the cross transoms 31 with the wheel piece. Similar transoms are more fully detailed in my above-mentioned copending applications.

Obviously minor changes in the construction of my improved car truck can be made without departing from the spirit of my invention as set forth in the appended claims.

I claim:

1. In a car truck, a wheel piece having integral pedestals, said wheel piece and said pedestals being provided with correlated openings for receiving the respective end of an equalizer bar during the application thereof in operative position.

2. In a car truck, a wheel piece box-shape in cross section, and pedestals formed integral with said wheel piece, said wheel piece being provided in its bottom wall with an opening co-extensive with the journal box opening thereof and one of the jaws of each pedestal being provided in its transverse wall with an opening extending downwardly from the opening in said wheel piece, said openings being adapted to accommodate one end of a depressed equalizer bar during the assembly thereof.

3. In a six wheel car truck, a wheel piece, spaced pedestals formed intergral therewith, said wheel piece being provided with openings in its lower face at points above the outer pedestals for receiving the outer ends of depressed equalizer bars during the application thereof in operative positions.

4. In a car truck, a frame with a wheel piece having side walls and an upper horizontal wall, a pedestal on said wheel piece having an enclosed opening in its leg below said horizontal wall, and a depressed equalizing bar passing through said opening and shaped so as to be removable from said pedestal by shifting its opposite end into the space between the walls of said wheel piece.

5. In a car truck, a frame with a wheel piece having side walls and an upper horizontal wall, spaced pedestals on said wheel piece having enclosed openings in their adjacent legs, and a depressed equalizing bar passing through said openings and shaped so that either end may be removed from its pedestal by shifting the other end into the space between the walls of said wheel piece.

6. In a car truck, a straight top wheel piece and a pedestal formed integrally therewith, said wheel piece having a recess in its bottom above said pedestal and said pedestal having an enclosed opening in its leg below said wheel piece, and a depressed equalizer extending through said opening and adapted to have its ends moved into said recess when the equalizer is applied or removed from the frame and pedestal, said equalizer being removable from said wheel piece and pedestal without disassembly of the latter.

7. In a car truck, a straight top wheel piece with recesses in its bottom, spaced pedestals formed integrally with said wheel piece with their legs on each side of said recesses and having permanently enclosed openings in their legs, and a depressed equalizer with each of its ends extending through an opening of a respective pedestal.

8. In a car truck, a one piece casting comprising a wheel piece and spaced pedestals formed integrally with said wheel piece, each pedestal having a leg with a permanently enclosed opening, said wheel piece having spaced side walls and a horizontal top wall over said pedestals, and a removable depressed equalizer with its respective ends extending through said pedestal openings and beneath the space enclosed by said wheel piece walls.

9. In a car truck, a wheel piece of inverted channel section over the truck journal boxes the web of said section being straight and imperforate over the journal boxes, spaced pedestals on said wheel piece having a permanently enclosed opening in one leg and beneath the web of said channel section, and a depressed equalizer with its ends inserted in said pedestal openings and removable therefrom by shifting movement of said equalizer.

10. In a six wheel car truck, a wheel piece having a horizontal top wall, three spaced pedestals thereon, journal boxes in said pedestal, there being a recess in said wheel piece above each end journal box and there being an enclosed opening in the inner leg of each end pedestal, and equalizers resting on said journal boxes and removable from said pedestals by shifting and vertically turning movement.

11. In a car truck, a frame including a wheel piece having an opening in its lower face, spaced pedestals having openings in their adjacent legs beneath said wheel piece, and a removable V-shaped equalizing bar extending through said pedestal openings.

12. In a car truck, a frame including a wheel piece having an opening in its lower face, spaced pedestals having openings in their adjacent legs beneath said wheel piece, a spring plank spaced from said frame, springs carried by and projecting outwardly from said spring plank, journal boxes in said pedestals, and an equalizer with its ends resting on said journal boxes and with its intermediate portion inclined downwardly and extending beneath the outwardly projecting portions of said springs.

13. In a car truck, a frame including a wheel piece having an opening in its lower face, spaced pedestals having openings in their adjacent legs beneath said wheel piece, a spring plank spaced from said frame, springs carried by and projecting outwardly from said spring plank, journal boxes in said pedestals, an equalizer with its ends resting on said journal boxes and with its intermediate portion inclined downwardly and extending beneath the outwardly projecting portions of said springs, and a seat for a spring on the inclined portion of said equalizing bar.

14. In a car truck a one piece cast steel frame comprising wheel pieces, cross transoms and pedestals, all cast integral, each of said pedestals having a leg with a permanently enclosed opening, each of said wheel pieces having spaced side walls and a horizontal top wall over said pedestals, and removable depressed equalizers, each with its respective ends extending through said openings, in adjacent pedestals and beneath the corresponding spaces enclosed by said wheel piece walls.

In testimony whereof I hereunto affix my signature this 28th day of May, 1925.

H. M. PFLAGER.